United States Patent
Medenica et al.

(10) Patent No.: US 9,669,758 B2
(45) Date of Patent: Jun. 6, 2017

(54) SYSTEM FOR ALERTING A DRIVER AND METHOD THEREOF

(71) Applicant: Honda Motor Co., Ltd., Tokyo (JP)

(72) Inventors: Zeljko Medenica, Southfield, MI (US); Craig Mitchell, Huntington Beach, CA (US); Bradford D Kent, San Pedro, CA (US); Jeffrey Grix, Long Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 105 days.

(21) Appl. No.: 14/813,537

(22) Filed: Jul. 30, 2015

(65) Prior Publication Data

US 2017/0028911 A1 Feb. 2, 2017

(51) Int. Cl.
*B60Q 9/00* (2006.01)
*G08B 21/02* (2006.01)
*G08B 21/06* (2006.01)

(52) U.S. Cl.
CPC ............ *B60Q 9/00* (2013.01); *G08B 21/02* (2013.01); *G08B 21/06* (2013.01)

(58) Field of Classification Search
CPC .......... B60Q 9/00; G08B 21/02; G08B 21/06; A61B 5/18; B60K 28/066
See application file for complete search history.

(56) References Cited

U.S. PATENT DOCUMENTS

| | | | |
|---|---|---|---|
| 3,788,357 A * | 1/1974 | Welk, Jr. | B60T 7/12 137/805 |
| 4,031,711 A | 6/1977 | MacNeil | |
| 4,565,997 A | 1/1986 | Seko et al. | |
| 4,999,821 A | 3/1991 | Kirkland | |
| 5,990,795 A | 11/1999 | Miller | |
| 7,015,818 B2 | 3/2006 | Takashima | |
| 7,301,465 B2 | 11/2007 | Tengshe et al. | |
| 7,982,620 B2 | 7/2011 | Prokhorov et al. | |
| 8,339,268 B2 | 12/2012 | Deng et al. | |
| 2003/0006897 A1* | 1/2003 | Chapin | B60Q 1/54 340/466 |
| 2006/0095175 A1* | 5/2006 | deWaal | G07C 5/008 701/31.4 |
| 2010/0188233 A1 | 7/2010 | Kuntzel | |
| 2012/0112879 A1* | 5/2012 | Ekchian | A61B 5/117 340/5.53 |
| 2014/0097960 A1* | 4/2014 | Guidry | E21B 41/0021 340/686.2 |
| 2014/0099175 A1* | 4/2014 | Guidry | B66C 1/445 414/22.51 |
| 2014/0300478 A1* | 10/2014 | Kume | B60K 28/066 340/576 |

FOREIGN PATENT DOCUMENTS

CN 2172658 Y 7/1994
CN 103625288 A 3/2014

* cited by examiner

*Primary Examiner* — Sisay Yacob
(74) *Attorney, Agent, or Firm* — Honda Patents & Technologies North America, LLC; Aaron C. Fong

(57) ABSTRACT

An alert system within a vehicle including a sensor and at least one speaker that generates at least one air thrust when a sensor detects a hazardous condition. The frequency and strength of the at least one air thrust varies based on the awareness level of the driver. In one embodiment, at least one air thrust is directed towards the driver from the direction of the hazardous condition. The hazardous condition may include, but is not limited to the driver falling asleep or a vehicle running a red light.

20 Claims, 5 Drawing Sheets

SYSTEM FOR ALERTING A DRIVER AND METHOD THEREOF

BACKGROUND

The present application generally relates to alerting a driver by an acoustically generated air thrust. Automobile manufacturers have recently begun to alert drivers by using a device or a plurality of devices that may include sound, air circulation, cold water mist spray, scent spray or temperature control. None of these systems, however, alert the driver through air thrusts created by at least one speaker.

BRIEF DESCRIPTION

According to one aspect of the present application, a device for alerting a driver is provided. The device may include at least one processor, at least one speaker, and a memory operatively coupled to a processor. The memory may store program instructions that when executed by the processor, causes the processor to detect an awareness level of the driver and actuate at least one air thrust created by at least one speaker in the direction of the driver when the awareness level of the driver is below a given threshold.

According to another aspect of the present application, an alert system within a vehicle is provided. The system includes a sensor and at least one speaker providing at least one air thrust in the direction of the driver when the awareness level of the driver is below a threshold.

According to yet another aspect of the present application, a method for alerting a driver is provided. The method may include monitoring the awareness level of the driver, the surroundings of the vehicle and the vehicle itself. The method may also include actuating at least one air thrust created by at least one speaker in the direction of the driver when the awareness level reaches a certain threshold or when a hazardous condition is detected.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing Figures are not necessarily drawn to scale and certain Figures may be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

Figure 1:
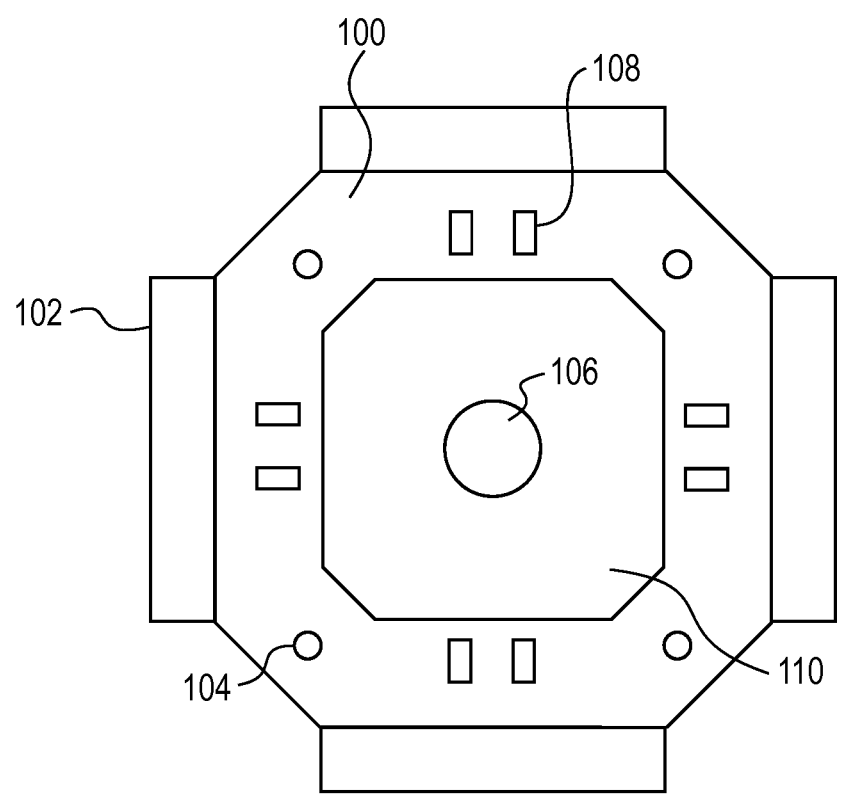
FIG. 1 illustrates a side view of an exemplary acoustic device for alerting a driver in accordance with one aspect of the present application.

The description set forth below in connection with the appended drawings is intended as a description of presently preferred embodiments of the application and is not intended to represent the only forms in which the present application may be constructed and/or utilized. The description sets forth the functions and the sequence of steps for constructing and operating the application in connection with the illustrated embodiments. It is to be understood, however, that the same or equivalent functions and sequences may be accomplished by different embodiments that are also intended to be encompassed within the spirit and scope of this application.

The following includes definitions of selected terms employed herein. The definitions include various examples and/or forms of components that fall within the scope of a term and that may be used for implementation. The examples are not intended to be limiting.

A "bus," as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

A "processor," as used herein, includes, but is not limited to a device that may process signals and perform general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "memory," as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device. Memory may be operatively coupled to the processor. The memory may store program instructions that may be executed by the processor.

An "operable connection" or a connection by which entities are "operably connected," as used herein, is one in which signals, physical communications, and/or logical communications may be sent and/or received. An operable connection may include a wireless interface, a physical interface, a data interface, and/or an electrical interface.

Generally described, the systems, devices, and methods disclosed herein are directed to alerting a driver through at least one acoustically generated air thrust. A sensor module may be provided for detecting a hazardous condition such as another vehicle running a red light or a driver's lack of attention. The driver of the vehicle may be alerted by at least one air thrust coming from the direction of the threat. The air thrust may also come from multiple directions in order to alert or wake up the driver. The at least one air thrust may be provided by at least one speaker once a sensor module detects a hazardous condition. The frequency and strength of the thrust may depend on the level of awareness of the driver or the level of the hazardous condition.

A number of advantages may be provided through the systems, devices, and methods described herein. In some embodiments, a reduction in costs is made. For example, speakers have become easy and more affordable to produce. The air thrust may be created by vibrations created by the speakers removing complicated and costly parts associated with other awareness devices. These speakers may be placed through the vehicle. Another advantage includes providing an actual physical stimulus which appeals to the driver's sense of touch. This type of stimulus is typically more effective. Different stimulants may be provided, for example, hot or cold air thrusts. In addition, the alarm may provide a direction in which the threat or condition is coming from introducing a more informative alert. Other advantages will become apparent from the description provided below.

Turning now to FIG. 1, a device 100 for providing alerts may include at least one speaker 102, thread inserts 104, an air output 106, fasteners 108, and a covering 110. Fewer or more of these components may be provided within the device 100 and those shown are not necessarily limiting to the device 100. Different views may reveal different features. Throughout the application, a number of embodiments of the device 100 are shown. Combinations of the components within the embodiments may be reconfigured and are within the scope of this application.

Typically, this device 100 may be used to alert a driver who is drowsy or not aware of their surroundings. The embodiment shown in FIG. 1 includes five speakers 102 that create at least one air thrust when the awareness level of the driver is below a threshold level. An awareness level may be determined through a number of ways. For example, if a sensor module detects that the driver has fallen or is falling asleep, the device 100 may be activated. Alternatively, if the vehicle begins to cross lane boundaries, an alert may be provided. The awareness level of the driver may also include red light runners and pedestrians. Each of these poses a hazardous condition and depends on the awareness level of the driver. Other scenarios exist and will become apparent from the description below.

The awareness level of the driver may be detected by various types of sensors including but not limited to facial recognition sensors, a blind spot monitor, parking sensors, a radar gun (used to detect the speed of other objects), a speedometer, speed sensors, an alarm sensor, and a proximity sensor. Sensors such as the facial recognition sensor monitor physical and physiological information of the driver including but not limited to posture, head movement, eye movement and body heat. The information gathered by the sensors is compared to information stored in the memory of device 100 and if the information gathered by the sensor meets the threshold value stored in the memory, the device 100 will activate.

The use of five speakers 102 on the device 100 may provide a large surface area and thus a large thrust of air may be produced by the speakers 102. These speakers 102 make vibrations and use of these vibrations create at least one air thrust to alarm the driver. Signals may be sent simultaneously to each of the speakers 102 to create a unified effect. Vehicle speakers that transmit music may be formatted to act as dual speakers that make vibrations creating at least one air thrust and music. The speakers 102 may be wireless as to enable them to be implemented in various positions in a vehicle.

The size and surface area of the speakers 102 may vary based on the model of the vehicle and the location of where the device may be implemented. For example, taxi cab drivers, truck drivers, bus drivers, or hired drivers who work long hours, may use devices that have multiple speakers 102 creating a large surface area in order to make sure that the drivers are alerted properly. Alternatively, vehicles that are used less often, for example those that only commute to work, fewer speakers 102 and less surface area would be used.

In one embodiment, the device 100 may create hot or cold air thrusts. Cooling elements, heating elements, or both, not shown, may be placed within the device 100. Mixing between hot and cold thrusts of air may be used. Depending on the weather conditions, a hot air thrust from the device 100 may be more efficient during cold air temperatures, while a cold air thrust may be more efficient during warmer air temperatures. Weather conditions may be determined through a global positioning system, local gauges, or other method.

In one embodiment, at least one light source, not shown, may be placed within the interior or exterior of the device 100. When the device 100 is actuated, the light source may light up notifying the driver that the device 100 may be activated. Lighting up the device 100 may cause a psychological reaction in the driver without actually providing the air thrust through the speakers 102.

Thread inserts 104 on the device 100 may be used to couple the device 100 in various places on a vehicle. A thread insert 104 may include a corkscrew type configuration. In one embodiment, female/male threading may be used to attach the device 100. Other types of securing mechanisms may be used such as magnets, hook and loop fasteners, or the like.

The configuration of the device 100 may include speakers 102 placed on distal ends from one another. In the shown example, speakers 102 may be placed on the top, bottom, left, and right within the device 100. A fifth speaker 102, not shown, may be provided on the back side of the device 100. When the device 100 is activated, air may be sucked into and sent outwards as a result of the diaphragm of the speakers 102 moving back and forth. Other types of speakers 102 exist and the device 100 is not limited to speakers using diaphragms.

The more speakers 102 that a device 100 entails and the larger the surface area of the speakers 102, the stronger and more directed the air thrust can be. Typically, the device 100 involves a combination of speakers 102 working simultaneously. In one embodiment, to create an air thrust, the speakers 102, expand to gather air and then compress to create vibrations and thus the air thrust. By combining multiple speakers and directing the compressed air stored by the speakers 102 in a limited space, the device 100 forces the compressed air out through a small opening creating the air thrust. The total surface area of the speakers 102 determines the strength of the air thrust thus the number and size of the speakers 102 can be important. Depending on the strength of the air thrust, the air pressure created by the air thrust of the device 100 may be noticed up to one meter away. Inaudible sounds may be generated by the speakers 102 such that the air thrusts may be created without the driver or any other passenger being aware of, for example, higher frequency sounds are typically not perceptible to a humans.

As described, speakers 102 may take in and expel air creating an air thrust. To direct the air from the speakers 102 on the device 100, an air output 106 may be provided. Heating elements, cooling elements, or both may be placed on the air output 106 or alternatively, other components of the device 100. The air output 106 may take on different shapes and is not limited to a circular opening as shown in FIG. 1.

A covering 110 may be placed opposite to the fifth speaker 102. The covering 110 may include the output 106 therein to allow the airflow to pass there through. In one embodiment, the covering 110 may open when the speakers 102 intakes air and closes when expelling air. Slits or apertures in the covering 110 may open and close on the device 100 allowing this process to take place.

In addition to the components of the device 100 described above, fasteners 108 may be used to secure wires as well as other attachments to the device 100. The fasteners 108 provide additional support and may be used along with the thread inserts 104 to better mount and hold the device in place in the vehicle. Straps, hook and loop fasteners, clip-ons, and the like are types of fasteners 108 that may be used on the device 100.

Figure 2A:
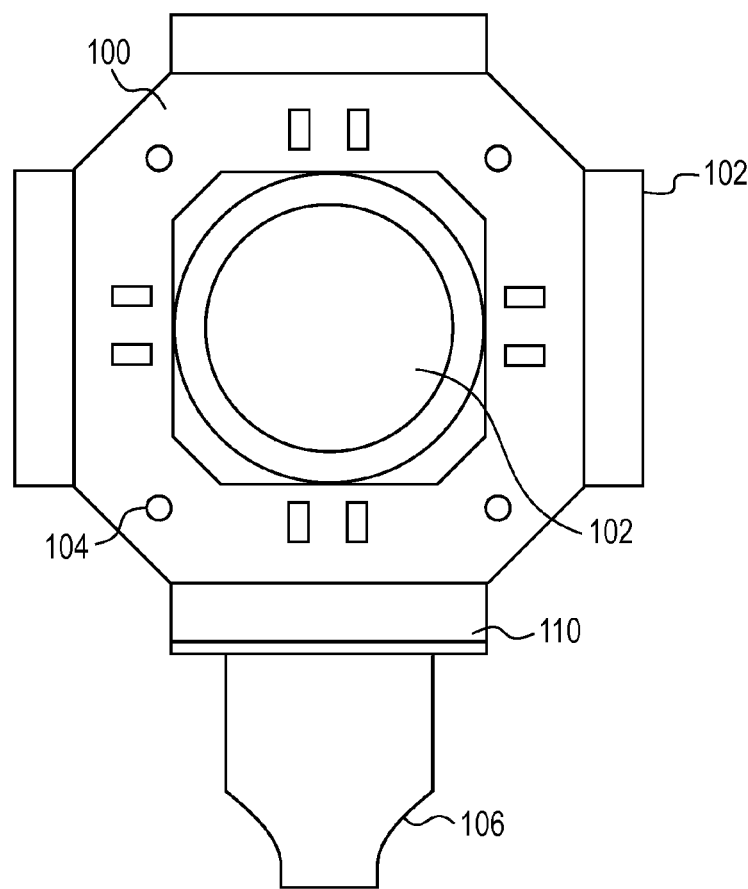
FIGS. 2A and 2B illustrate a top view of two exemplary acoustic devices for alerting a driver in accordance with aspects of the present application.

With reference now to FIG. 2A, a top view of the exemplary acoustic device 100 for alerting a driver in accordance with one aspect of the present application is provided. The air output 106 may protrude outwards and is powered by five speakers 102 and projects at least one air thrust in the driver's direction. A covering 110 as mentioned above is also depicted and may connect the air output 106 to the device 100.

Figure 2B:
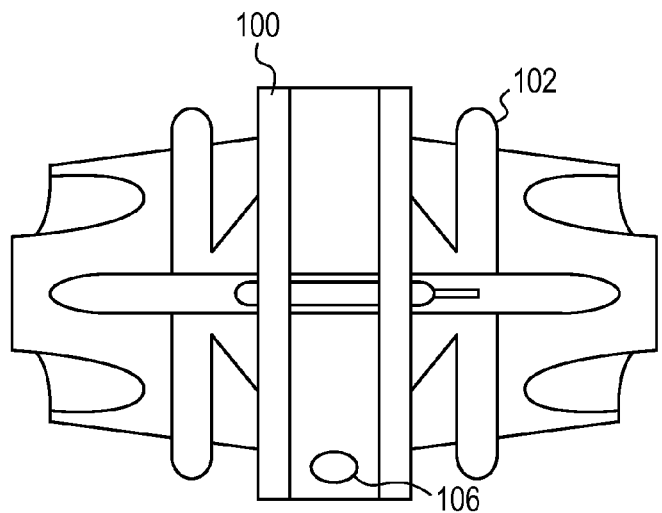

FIG. 2B provides an embodiment of the device 100 for alerting a driver that includes two speakers 102 and a different version of an air output 106 in accordance with one aspect of the present application. Using two speakers 102 may reduce the cost to manufacture the device 100. The size of the individual speakers 102 may be adjusted to change the surface area to create stronger and more frequent air thrusts. The air output 106 may be a circular hole instead of the elongated component described above. The air output 106 is not limited to those forms seen in FIGS. 2A and 2B.

Figure 3:
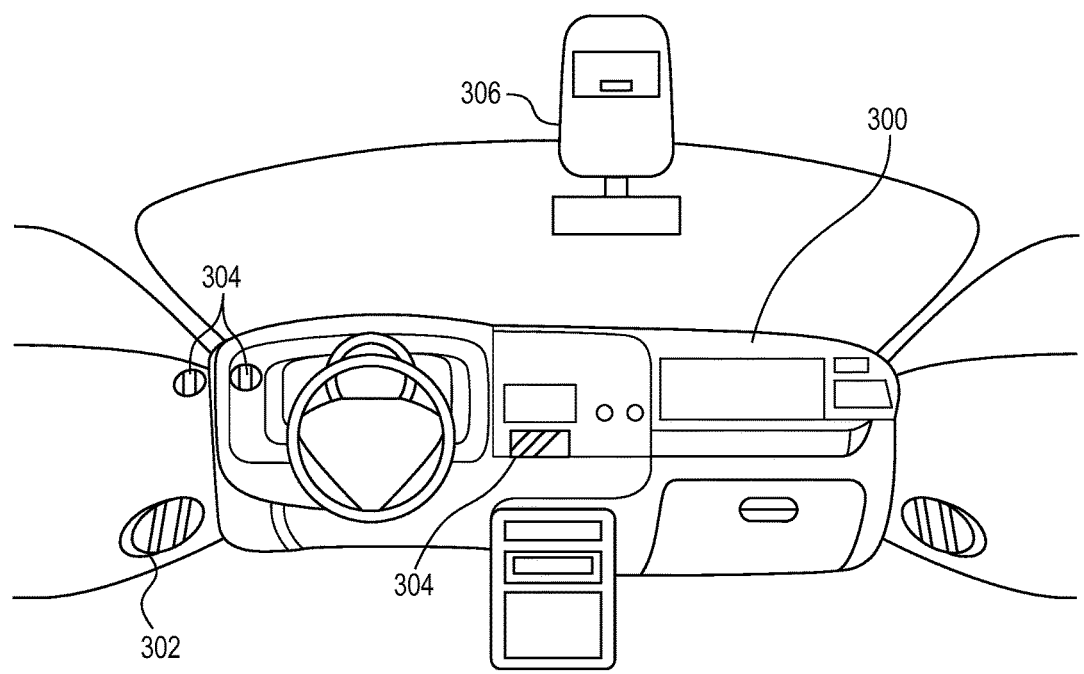
FIG. 3 illustrates a first person view of an exemplary implementation of the acoustic device for alerting a driver in a vehicle in accordance with one aspect of the present application.

Turning to FIG. 3, a first person view of an exemplary implementation of the acoustic device 100 for alerting a driver in a vehicle in accordance with one aspect of the present application is provided. The device 100 may be placed in various locations in the vehicle 300 by using thread inserts 104 or other types of securing mechanisms. In one embodiment, quarter twenty thread inserts may be used for thread inserts 104. The location of the thread inserts 104 may vary to allow the device 100 to be implemented in various locations in the vehicle 300. Wireless speakers 102 may be used for easy movement of the device 100. Other types of mechanisms such as clip-ons and hook and loop fasteners may also be used. In one embodiment, the device 100 may be mounted at various angles of the vehicle 300 and may be adjusted using pivoting hinges. The device 100 may also be mounted in various other locations in the vehicle 300 such as the doors and the air conditioning systems.

In one embodiment, current speakers placed within the vehicle 300 may be used. These speakers may have a dual function, for sound as well as air thrusts. In one embodiment, the device 100 may also be implemented on the roof 306 of the vehicle 300 above the driver at different angles in order to alert the driver of hazardous conditions ahead of the vehicle 300.

The device 100 may be implemented so that at least one air thrust may alert the driver. Multiple devices 100 may be implemented in a vehicle 300 allowing multiple air thrusts or a directed air thrust coming from a particular direction. In one embodiment, the air thrust may come from the direction where a hazardous condition is present. The device 100 may be mounted on the side or front interior of the vehicle 300 indicating a jaywalking pedestrian. Thus, the positioning of the at least one device 100 may be dependent on how to alert the driver from the correct direction so that a hazardous condition may be avoided.

In one embodiment, air thrusts may be generated behind the driver. A sensor may detect an approaching vehicle from behind and provide the air thrust to warn the driver that a vehicle is about to rear end them.

At least one air thrust may be provided from the direction of the hazardous condition and thus the driver may physically understand where the threat is coming from. For example, if a vehicle runs a red light in front of the vehicle, the sensor module may detect this occurrence and the device 100 may provide at least one air thrust from the direction of where the other vehicle is running the red light. In one embodiment where the driver is falling asleep, the system may provide an air thrust from all directions and thus this impact may alarm the driver. Another advantage is that this device 100 may be implemented in various places in the vehicle as shown in FIG. 3. For example, the device may be placed on the dash board or it may be implemented as a part of the speakers in the vehicle 302. The device may even be placed in the air ducts 304 as needed in traditional air systems. Additionally, the number of speakers may be changed providing for a larger or a smaller surface area depending on the vehicle type or the use of the device.

Figure 4:
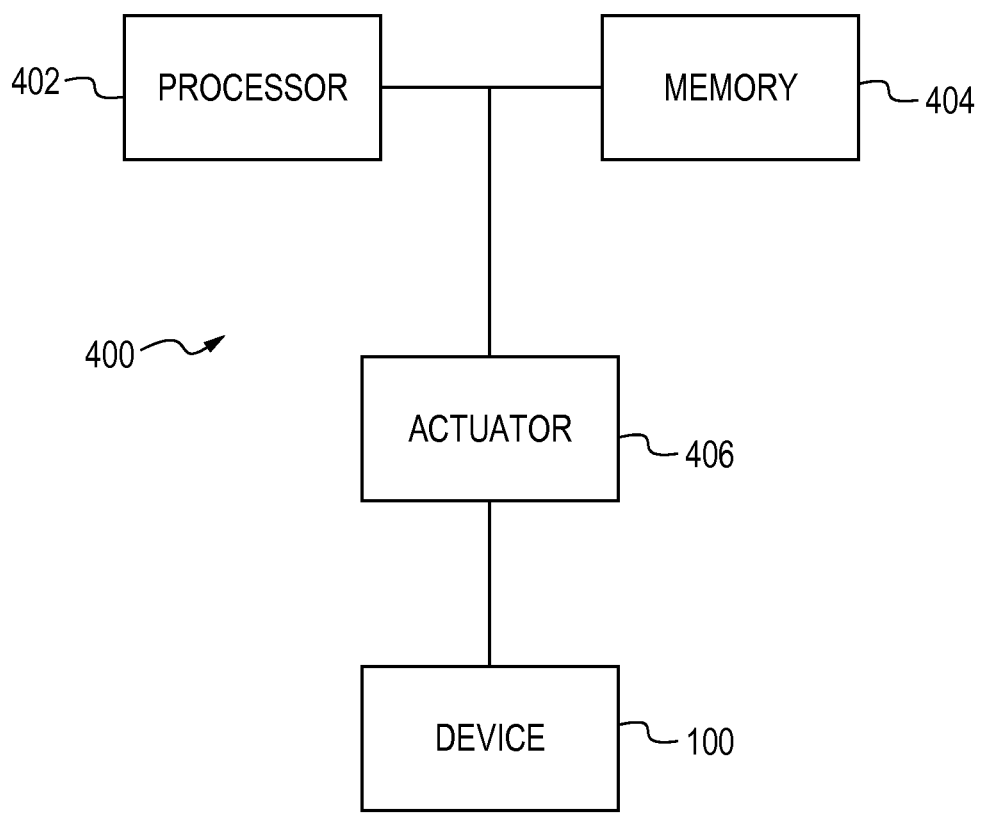
FIG. 4 illustrates an exemplary system for the acoustic device in accordance with one aspect of the present application.

FIG. 4 illustrates an exemplary system 400 for the acoustic device 100 in accordance with one aspect of the present application. The system 400 may include a processor 402, memory 404, actuator 406, and speaker 102, the speaker 102 being described earlier. Fewer or more components may be part of the system 400. Operable connections may be used between each of the components which may communicate over a bus.

The memory 404 of the system 400 may be operatively coupled to the processor 402. The memory 404 may store program instructions that may be executed by the processor 402. The memory 404 may store, for example, information such as awareness threshold levels as well as information on the facial features of a driver, which may be adjustable. The memory 404 may also store information on the driving tendencies of the driver including the vehicle speed, directions and routes used in order to determine changes in driving to calculate if the vehicle 300 is beginning to swerve into another lane or to determine if the driver is losing control. For example, if the driver has a tendency to stay in the left portion of the lane, the system 400 may take into account that the driver is not veering from their lane and an activation of the device 100 would not be used. Alternatively, when the driver has a tendency to stay in the middle of the lane but the sensors detect that the driver is off to the left portion of the lane, an actuation of the device 100 may be made.

Coupled with the memory 404, the processor 402 may detect an awareness level of the driver and may activate the actuator 406 causing the device 100 to produce at least one air thrust in the direction of the driver of the vehicle 300. The air thrust may be created by at least one device 100 and is projected in the direction of the driver when the awareness level of the driver is below a threshold.

The system 400 may provide acoustically generated air thrusts through the device 100 to alert a driver. The device 100 may be activated when an awareness level of the driver is below a threshold. A sensor, such as a facial recognition module, may detect whether the driver is falling or has fallen asleep. Threshold values may include, for example, whether the eyes of the driver have stayed open for a period of time, or alternatively, head movements of the driver may indicate that the driver may be tired. The threshold level may include the period of time where the driver's eyes are closed, for example, a half second. The threshold level may include how many times a driver's head bobs up and down over a given period of time, for example, three nods for every ten seconds.

A body sensor module may be used. The sensor may detect the motion of a driver. The threshold level may be based on the lack of motion of a driver. When the driver does not move, or at least does not make enough motions, within a period of time, the awareness level is below the threshold and the actuator 406 of the system 400 is activated causing the device 100 to produce an air thrust.

In one embodiment, a heat sensor module may be used. A low awareness level of the driver may be indicated by a lower temperature. Physiological sensor modules may be used, that may be incorporated in the form of wearables. These types of sensors within the system 400 may detect brain activities in order to determine whether to activate the actuator 406 and thereby provide an air thrust through the acoustic device 100.

Vehicle sensor modules may also be used to determine the awareness level of the driver. For example, swerving may be detected through the vehicle. The awareness level of the driver may be considered low when the driver goes between lanes. The threshold level, and falling below it, may be determined on how quickly the driver crosses lanes. When the driver takes a long period of time to cross lanes, the driver may have fallen asleep or is impaired and thus, the level of awareness has fallen below a threshold such that activation of the device 100 may be performed. Oppositely, and if the driver quickly crosses lanes, the driver is more likely to be alert and activation of the device 100 would not be warranted.

Steering wheel sensors may also be used to measure the driver's awareness level and whether to activate the system 400. In one embodiment, the sensors may determine how alert the driver is depending on the grip of the user on the steering wheel. A lower level of tightness may indicate that the driver's awareness level is low. When the alertness is lower than a threshold, then the actuator 406 of the system 400 may be activated. Steering wheel sensors may also measure the lack of heat on the driver's palm. This may indicate that the driver is falling asleep or at least drowsy. The same types of sensors may be placed on the shifter of a vehicle 300. Certain drivers like to place their hand on the shifter while driving where the awareness level may be measured.

While individual sensor modules were described above, a combination of sensors may be used. For example, a facial recognition sensor may be used in conjunction with a vehicle sensor to determine if the driver has fallen asleep and whether the device 100 should be activated.

The sensor modules described above are typically found in the vehicle 300. However, the system 400 may retrieve information on the outside of the vehicle to activate the device 100. These sensors may not be focused on the driver rather they may be focused on the environment in which the driver is located in. A combination of in-vehicle sensors as well as environmental or outside sensors may be used to determine whether to activate the device 100. Furthermore, the sensors do not have to be affixed to the vehicle 300 rather they may be portable, for example, sensor data retrieved from a smartphone.

Sensors outside of the vehicle 300 may include pedestrian or red light runner detectors. These hazardous conditions, when detected by the sensors, may warrant an alert by the system 400. The awareness level of the driver would be below a threshold, especially in light of these hazardous conditions.

Red light runners may be detected by vehicle sensors on the exterior of the vehicle. Alternatively, global positioning systems may identify a vehicle that is about to cross into an intersection and in addition, determine whether the intersection is red. A driver's level of awareness for hazardous conditions may be mitigated by in vehicle sensors that detect the head angle of the driver is directed at the red light runner. When the driver is aware, the actuator 406 would be inactive.

Other exterior sensors may include vehicle detectors. In one example, the driver may be alerted through the device 100 when a driver's vehicle 300 is making a turn and the driver is unaware of an oncoming vehicle. Depending on whether there are multiple devices 100, a thrust of air may be provided by a device 100 from the direction of the hazardous condition and the lack of awareness by the driver is below a threshold, e.g., the driver is not looking at the approaching vehicle. Vehicle-to-Vehicle (V2V) or Vehicle-to-Everything (V2X) communications may also be used such that even though the driver is unaware of a hazard, the vehicle 300 itself may be aware of a dangerous condition.

The actuator 406 of the internal system 400 of the vehicle 300 may also be activated during a driver's lack of awareness when pedestrians are around. For example, pedestrians crossing illegally or legally may not be noticed by the driver, the driver thereby being notified by the system 400 through the device 100 and the actuator 406. Head angle detectors, described above, may be used to determine whether the driver is aware of the pedestrians.

Other conditions may exist where the actuator 406 may be activated. For example, emergency vehicles may be detected through sensors located on the outside of the vehicle 300. When the emergency vehicles are within the area and the driver is not aware, the device 100 within the vehicle 300 may be activated. In one embodiment, the system 400 may determine whether the driver has pulled to the side of the road. If not, then the device 100 may be activated.

Notifications of road hazards may also be provided to the driver through the system 400, for example, pot holes. When a road hazard is detected by vehicle sensors, the actuator 406 may be activated. In one embodiment, placements of potholes or other road hazards may be mapped within a database along with their coordinates. The potholes may not be seen until it is too late, i.e., the driver's awareness level may be low with regards to the road conditions.

Different types air thrusts and alarms may be provided depending on the condition, for example, thrusts of air may be directed from the lower portion of the vehicle 300 upwards for road hazards. Air thrusts may be created from the sides for vehicle or pedestrian alerts. In addition, the device 100 of the system 400 may generate air thrusts from the roof 306 of the vehicle 300 when emergency vehicles are around. These are a few scenarios and the present application should not be limited to those described.

Continuing with FIG. 4, the frequency and number of air thrusts may be determined by the awareness level of the driver. In one embodiment, the device 100 may provide at least one air thrust at a frequency and strength at a first level of driver awareness and the device 100 also provides at least one air thrust at a second lower frequency and number at a second level of driver awareness. The second level of driver awareness is higher than the first level of driver awareness.

While air thrusts were describe above, as being the sole use of providing awareness to the driver, the acoustic device 100 generating the air thrusts may be used in combination with other alert devices, for example, sound, air circulation, cold water mist spray, scent spray or temperature control.

Once the processor 402 begins executing instructions stored by the memory 404, the system 400 in one embodiment may control the intake timing and push out timing. The system 400 in that embodiment may reverse polarity for 30 milliseconds and then the speaker pops open and expands the chamber and then pushes out for 30 milliseconds resulting in overall 60 milliseconds of time. Those times may be adjustable, for example, the push out may be exponential.

At a zero state, the volume within the chamber of device 100 may be steady. Once a signal, or electric current, activates the device 100, an air vortex ring may be created such that the device 100 draws air in through the air output 106 and the diaphragm of the speakers 102 of the device 100 are drawn inwards towards its coil, for example at negative six millimeters. When the diaphragm is pulled in, the overall volume of the chamber of the device 100 increases. A reverse signal is then applied causing the speakers 102 to compress the air, i.e., the diaphragm of the speakers 102 extend at plus six millimeters, for example. The speakers 102 thus, and in one embodiment, sway back and forth at negative six millimeters to a positive six millimeters. This compression of volume caused by the diaphragm of the speakers 102 cause the air to exit through the air output 106 and thus creating the directed air thrust. The thrust of air created by this process in the direction of the driver may be felt at a distance of one meter in one embodiment.

Figure 5:
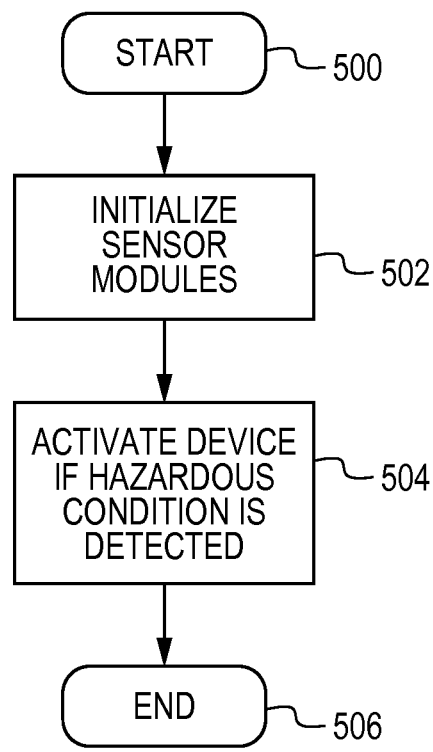
FIG. 5 illustrates an exemplary flow chart of operating an acoustic device for alerting a driver in accordance with one aspect of the present application.

In FIG. 5, an exemplary flow chart of operating an acoustic device 100 for alerting a driver in accordance with one aspect of the present application is provided. The processes may begin at block 500. At block 502, the sensors may be initialized. The system 500 may include sensor modules 502 inside and/or outside of the vehicle 300 to detect hazardous conditions. A number of different sensors may be used either alone or in combination to determine whether the device 100 may be activated.

When a hazardous condition is detected, at block 504, at least one speaker generates at least one air thrust that is sent through an air output 106. In one embodiment, and once the sensor modules no longer detect a hazardous condition, the device 100 may stop actuating air thrusts at block 506.

The foregoing description is provided to enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this application that are known or later come to be known to those of ordinary skill in the relevant art are expressly incorporated herein by reference and intended to be encompassed by the claims. Moreover, nothing disclosed herein is intended to be dedicated to the public regardless of whether such application is explicitly recited in the claims.

What is claimed is:

1. A device for alerting a driver, comprising;
   at least one processor;
   at least one speaker; and
   a memory operatively coupled to the processor, the memory storing program instructions that when executed by the processor, causes the processor to:
   detect an awareness level of the driver;
   actuate at least one air thrust created by the at least one speaker in the direction of the driver when the awareness level of the driver is below a threshold.

2. The device of claim 1, wherein the at least one air thrust is projected through an air output created by a combination of speakers.

3. The device of claim 1, wherein detecting the awareness level of the driver is determined by a facial module, a sensor module detecting vehicle swerving, or a sensor detecting movement ahead or to either side of the vehicle.

4. The device of claim 1, wherein actuating the at least one air thrust comprises:
   providing air thrusts at a frequency and number at a first level of driver awareness; and
   providing air thrusts at a second lower frequency and number at a second level of driver awareness, wherein the second level of driver awareness is higher than the first level of driver awareness.

5. The device of claim 1, wherein actuating the at least one air thrust comprises directing air thrusts from at least one of multiple directions and direction from which awareness level is lacking.

6. The device of claim 1, comprising at least one fastener securing wires associated with the at least one speaker.

7. The device of claim 1, comprising two speakers creating the at least one air thrust.

8. The device of claim 1, comprising five speakers creating the at least one air thrust.

9. An alert system within a vehicle comprising:
   a sensor; and
   at least one speaker providing at least one air thrust in the direction of the driver when the awareness level of the driver is below a threshold.

10. The system of claim 9, wherein the at least one air thrust is generated by a combination of speakers with the at least one air thrust sent through an air output.

11. The system of claim 9, wherein the sensor is a facial recognition module detecting drowsiness of a driver of the vehicle based on facial features of the driver.

12. The system of claim 9, wherein the sensor detects vehicle swerving.

13. The system of claim 9, wherein the sensor detects at least one of movement at a predetermined distance ahead of the vehicle, movement at a predetermined distance to the right side of the vehicle, and movement at a predetermined distance to the left side of the vehicle.

14. The system of claim 9, wherein generating at least one air thrust comprises:
   providing air thrusts at a frequency and number at a first level of driver awareness; and
   providing air thrusts at a second lower frequency and number at a second level of driver awareness, wherein the second level of driver awareness is higher than the first level of driver awareness.

15. The system of claim 9, wherein the at least one air thrust is hot air or cold air.

16. The method of claim 9, wherein the awareness level of the driver is below a threshold when the driver is unaware of a pedestrian is crossing a street or another vehicle runs a red light.

17. A method for stimulating a driver, comprising;
   monitoring an awareness level of the driver; and
   actuating at least one air thrust created by at least one speaker in the direction of the driver when the awareness level of the driver poses a hazardous condition.

18. The method of claim 17, wherein the hazardous condition is the driver falling asleep.

19. The method of claim 17, wherein actuating the at least one air thrust comprises providing the at least one air thrust from the direction of the hazardous condition.

20. The method of claim 17, wherein actuating the at least one air thrust comprises hot air or cold air.

* * * * *